United States Patent
Ayres et al.

(10) Patent No.: US 10,915,868 B2
(45) Date of Patent: Feb. 9, 2021

(54) DISPLAYING LIFE EVENTS WHILE NAVIGATING A CALENDAR

(71) Applicant: Microsoft Technology Licensing, LLC, Redmond, WA (US)

(72) Inventors: Lynn Ayres, Redmond, WA (US); Kirk Fernandes, Seattle, WA (US); Alice Jane Brush, Bellevue, WA (US); Nelson Siu, Kirkland, WA (US); Jonathan Cadiz, Bellevue, WA (US); Choon-mun Hooi, Seattle, WA (US); Kathryn Elizabeth Suskin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/919,436

(22) Filed: Jun. 17, 2013

(65) Prior Publication Data
US 2014/0372898 A1    Dec. 18, 2014

(51) Int. Cl.
*G06F 3/0484* (2013.01)
*G06Q 10/10* (2012.01)
*H04M 1/725* (2021.01)

(52) U.S. Cl.
CPC ....... *G06Q 10/109* (2013.01); *G06Q 10/1093* (2013.01); *H04M 1/72566* (2013.01)

(58) Field of Classification Search
CPC ... G06F 3/04842; G06F 3/048; G06Q 10/109; G06Q 10/1093; H04M 1/72566
USPC ......................................................... 715/744
See application file for complete search history.

(56) References Cited

U.S. PATENT DOCUMENTS

| 5,832,640 | A  | 11/1998 | Cadotte |
| 6,832,242 | B2 | 12/2004 | Keskar |
| 7,234,117 | B2 | 6/2007  | Zaner et al. |
| 7,461,099 | B1 | 12/2008 | Sharpe et al. |

(Continued)

FOREIGN PATENT DOCUMENTS

| CN | 1914631 A   | 2/2007 |
| CN | 101068418 A | 11/2007 |

(Continued)

OTHER PUBLICATIONS

Derthick, et al., "Using Online Calendaring Systems to Support Reminiscence", In Proceedings of the International Conference on Human Factors in Computing Systems, May 7, 2011, 6 pages.

(Continued)

*Primary Examiner* — Jeanette J Parker

(57) ABSTRACT

Life events relating to a user are displayed on a calendar. A user may navigate to different time periods in the calendar and see past life events relating to the user displayed on the calendar. The life events that are displayed on the calendar may include different types of content and be determined from different sources. For example, the life events for the time period may be: pictures, events, social media posts, messages, and the like. Different content sources may be used to locate the life events relating to the user. The life events that are selected for display on the calendar may be shown differently from other content that is included on the calendar. The life events may be processed to adjust an appearance of the life event before it is displayed. A user may also share a life experience with other users.

20 Claims, 11 Drawing Sheets

(56) References Cited

U.S. PATENT DOCUMENTS

| | | | |
|---|---|---|---|
| 7,630,544 B1 | 12/2009 | Zhou | |
| 7,631,252 B2 | 12/2009 | Hertzfeld et al. | |
| 7,631,253 B2 | 12/2009 | Hertzfeld et al. | |
| 7,778,926 B1 | 8/2010 | Grinchenko et al. | |
| 7,953,796 B2 | 5/2011 | Brush et al. | |
| 8,099,679 B2 | 1/2012 | Yee et al. | |
| 2002/0161603 A1 | 10/2002 | Gonzales | |
| 2003/0076353 A1 | 4/2003 | Blackstock et al. | |
| 2003/0156138 A1 | 8/2003 | Vronay et al. | |
| 2004/0068521 A1 | 4/2004 | Haacke et al. | |
| 2004/0085578 A1 | 5/2004 | Quek et al. | |
| 2004/0267625 A1 | 12/2004 | Feng et al. | |
| 2005/0052685 A1 | 3/2005 | Herf et al. | |
| 2005/0169499 A1 | 8/2005 | Rodriguez et al. | |
| 2005/0234864 A1 | 10/2005 | Shapiro | |
| 2005/0246374 A1 | 11/2005 | Blinn et al. | |
| 2006/0078201 A1 | 4/2006 | Kim et al. | |
| 2006/0174205 A1 | 8/2006 | Jung et al. | |
| 2006/0235926 A1 | 10/2006 | Naruse | |
| 2006/0268120 A1 | 11/2006 | Funakura et al. | |
| 2007/0008321 A1 | 1/2007 | Gallagher et al. | |
| 2007/0129817 A1 | 6/2007 | Cadiz et al. | |
| 2007/0157107 A1 | 7/2007 | Bishop | |
| 2007/0157114 A1 | 7/2007 | Bishop et al. | |
| 2007/0162845 A1 | 7/2007 | Cave et al. | |
| 2007/0168463 A1 | 7/2007 | Rothschild | |
| 2007/0236505 A1 | 10/2007 | Jung et al. | |
| 2008/0009272 A1 | 1/2008 | Toledano | |
| 2008/0133697 A1 | 6/2008 | Stewart et al. | |
| 2008/0174676 A1 | 7/2008 | Squilla et al. | |
| 2008/0175103 A1 | 7/2008 | Nakamura et al. | |
| 2008/0177617 A1 | 7/2008 | Gupta | |
| 2008/0201734 A1 | 8/2008 | Lyon et al. | |
| 2008/0259734 A1 | 10/2008 | Jain | |
| 2008/0294663 A1 | 11/2008 | Heinley et al. | |
| 2009/0097361 A1 | 4/2009 | Nakamura et al. | |
| 2009/0158173 A1* | 6/2009 | Palahnuk | G06Q 30/00 715/753 |
| 2009/0161962 A1 | 6/2009 | Gallagher et al. | |
| 2010/0042648 A1 | 2/2010 | Cannon et al. | |
| 2011/0078612 A1* | 3/2011 | Matsuzawa | G06F 15/0225 715/772 |
| 2012/0039546 A1 | 2/2012 | Berger et al. | |
| 2013/0103688 A1 | 4/2013 | Tien et al. | |
| 2013/0117684 A1 | 5/2013 | Ingole et al. | |
| 2013/0159429 A1 | 6/2013 | Nalliah et al. | |
| 2013/0227432 A1* | 8/2013 | Lin | H04L 41/22 715/753 |
| 2013/0326385 A1* | 12/2013 | Verstraete | 715/771 |
| 2015/0363747 A1* | 12/2015 | Agarwal | G06Q 10/1093 705/7.24 |

FOREIGN PATENT DOCUMENTS

| | | |
|---|---|---|
| CN | 103023759 A | 4/2013 |
| KR | 20070106930 A | 11/2007 |
| WO | WO 2007/082167 | 7/2007 |
| WO | 2013/050420 A1 | 4/2013 |

OTHER PUBLICATIONS

Chen, et al., "Reminiscing View: Event-Based Browsing of Consumer's Photo and Video-Clip Collections", In Tenth IEEE International Symposium on Multimedia, Dec. 15, 2008, 8 pages.
Kikhia, Basel, "Supporting Lifestories through Activity Recognition and Digital Reminiscence", In Licentiate Thesis, Mar. 2011, 94 pages.
Hallberg, et al., "Reminiscence Processes Using Life-Log Entities for Persons with Mild Dementia", In Proceeding of the First International Workshop on Reminiscence Systems, Sep. 2009, 6 pages.
Hangal, Sudheendra, "Reshaping Reminiscence, Web Browsing and Web Search Using Personal Digital Archives", A Dissertation Submitted to the Department of Computer Science and the Committee on Graduate Studies of Stanford University in Partial Fulfillment of the Requirements for the Degree of Doctor of Philosophy, Dec. 2012, 168 pages.
Cosley, et al., "Experiences with a Publicly Deployed Tool for Reminiscing", In Proceedings of the First International Workshop on Reminiscence Systems, Sep. 5, 2009, 6 pages.
"ShutterCal", Retrieved on: Apr. 22, 2013, Available at: http://shuttercal.com/.
International Search Report dated Mar. 18, 2015 cited in Application No. PCT/US2014/41257, 12 pgs.
"Phanphare: Photo and Video Sharing for Families—AppScout", http://www.appscout.com/2008/01/phanphare_photo_and_video_shari.php.
"Photo Sharing 2.0", http://www.jakeludington.com/digital_lifestyle_report/20060213_photo_sharing20.html.
"Powersnap: A Powerful New Free Application Enables the First True Peer-to-Peer Photo and Image Networks", Jan. 23, 2007, http://www.powersnap.com/news.html.
Brush, et al., "'Today' Messages: Lightweight Support for Small Group Awareness via Email", Proceedings of the 38th Hawaii International Conference on System Sciences—2005. pp. 1-10.
Consolvo, et al., "The CareNet Display: Lessons Learned from an In Home Evaluation of an Ambient Display", Proc. Ubicomp, 2004, pp. 1-17.
Dey, et al., "From Awareness to Connectedness: The Design and Deployment of Presence Displays", CHI 2006 Proceedings—Awareness and Presence. Apr. 22-27, 2006. Montreal, Quebec, Canada, pp. 899-908.
Frohlich, et al., "Requirements for Photoware", Proc. ACM CSCW02 (Nov. 16-20, 2002, New Orleans, Louisiana), 2002, pp. 166-175.
Grudin, "Groupware and Social Dynamics: Eight Challenges for Developers", Communications of the ACM, Jan. 1994, pp. 92-105, vol. 37, No. 1.
Hindus, et al., "Casablanca: Designing Social Communication Devices for the Home", SIGCHI'01, Mar. 31-Apr. 4, 2001, Seattle, WA, USA. pp. 325-332.
Hutchinson, et al., "Technology Probes: Inspiring Design for and with Families", Proc. ACM CHI, 2003, pp. 17-24.
Kaye, et al., "Communicating Intimacy One Bit at a Time", CHI 2005, Apr. 2-7, 2005, Portland, Oregon, USA. pp. 1529-1532.
Kirk, et al., "Understanding Photowork", Proc. ACM CHI 2006 (Apr. 22-27, 2006, Montreal, Quebec, Canada), 2006, pp. 761-770.
Liechti, et al., "A Digital Photography Framework Enabling Affective Awareness in Home Communication", Personal and Ubiquitous Computing, 2000, pp. 4-24, vol. 4.
Miller, et al., "Give and Take: A Study of Consumer Photo-Sharing Culture and Practice", Proc. ACM CHI 2007 (Apr. 28-May 3, 2007, San Jose, CA), pp. 347-356.
Mossberg, et al., "A New and Simple Way to Share Digital Photos" Apr. 26, 2006. http://solution.allthingsd.com/20060426/sharingdigital-photos.
Mynatt, et al., "Digital Family Portraits: Supporting Peace of Mind for Extended Family Members", CHI Mar. 31-Apr. 5, 2001, vol. No. 3, Issue No. 1. pp. 333-340.
Neustaedter, et al., "Interpersonal Awareness in the Domestic Realm", Proc. OZCHI Sydney, Australia, Nov. 20-24, 2006, pp. 15-22.
Neustaedter, et al., "'Linc-ing'The Family: The Participatory Design of an Inkable Family Calendar", Proc. ACM CHI 2006 (Apr. 22-27, 2006, Montreal, Quebec, Canada), 2006, pp. 141-150.
Plaisant, et al., "Shared Family Calendars: Promoting Synunetry and Accessibility", ACM TOCHI, Sep. 2006, pp. 313-346, vol. 13, No. 3.
Rettie, "Connectedness, Awareness and Social Presence" 6th International Presence Workshop, Aalborg.2003. 7 Pages.
Romero, "Connecting the Family with Awareness Systems", Personal and Ubiquitous Computing, Apr. 2007, pp. 299-312, vol. 11, No. 4.
Smale, et al., "Transient Life: Collecting and sharing personal information", Proc. OZCHI Sydney, Australia, Nov. 20-24, 2006, pp. 31-38.
U.S. Appl. No. 12/060,882, Amendment and Response filed Dec. 22, 2010, 13 pgs.

(56) References Cited

OTHER PUBLICATIONS

U.S. Appl. No. 12/060,882, Amendment and Response filed Apr. 26, 2010, 14 pgs.
U.S. Appl. No. 12/060,882, Notice of Allowance dated Mar. 22, 2011, 15 pgs.
U.S. Appl. No. 12/060,882, Office Action dated Dec. 24, 2009, 14 pgs.
U.S. Appl. No. 12/060,882, Office Action dated Jul. 22, 2010, 18 pgs.
Venkatesh, "The Tech-Enabled Networked Home: An Analysis of Current Trends and Future Promise," in Transforming Enterprise: The Economic and Social Implications of Information Technology (William H. Dutton, et al., eds.), MIT Press, 2005, pp. 413-435.
European Extended Search Report in Application 14736165.3, dated Oct. 28, 2016, 7 pgs.
Wikipedia: "Google Calendar", Internet Article, Jun. 6, 2013, Retrieved from the Internet: URL:https://en.wikipedia.org/w/index.php?title=Google Calendar&oldid=558560096, retrieved on Oct. 19, 2016, 6 pgs.
Marziah Karch: "Android for Work: Productivity for Professionals", Aug. 31, 2010, Apress, Chapters 3, and 7-11, 120 pgs.
Bill Dyszel: "Outlook 2013 for Dummies", Mar. 4, 2013, For Dummies, Chapters 8, 11 and 17, 388 pgs.
Wikipedia: "Mobile Web", Internet Article, Jun. 15, 2013, Retrieved from the Internet: URL:https://en.wikipedia.org/w/index.php?title=Mobile Web&oldid=560066364, retrieved on Oct. 19, 2016, 6 pgs.
Sherry Kinkoph Gunter, "Sams Teach Yourself Facebook in 10 Minutes (3rd Edition)", Apr. 5, 2012, Sams Publishing, Ch 9, p. 111-p. 112, 40 pgs.
Tim Priebe: "The Beginner's s Guide to Facebook Timeline for Business", Apr. 23, 2012, T&S Web Design, p. 20-p. 21, 14 pgs.
Teruhiko Teraoka, "A Study of Exploration of Heterogeneous Personal Data Collected from Mobile Devices and Web Services", In Proceedings of 5th FTRA International Conference on Multimedia and Ubiquitous Engineering, located at: http://ieeexplore.ieee.org/stamp/stamp.jsp?tp=&arnumber=5992196, published Jun. 28, 2011, 7 pages.
"First Office Action and Search Report Issued in Chinese Patent Application No. 201480034525.5", dated Mar. 2, 2018, 14 Pages.
"Exif", Retreived from https://en.wikipedia.org/w/index.php?title=Exif&oldid=559456087, Jun. 11, 2013, 8 Pages.
"Reminiscence Therapy", Retrieved From https://en.wikipedia.org/w/index.php?title=Reminiscence_therapy&oldid=533463637, Jan. 17, 2013, 10 Pages.
"Social Network Aggregation", Retrieved from https://en.wikipedia.org/w/index.php?title=Social_network_aggregation&oldid=559626200, Jun. 12, 2013, 3 Pages.
"Office Action Issued in European Patent Application No. 14736165.3", dated Jul. 27, 2018, 8 Pages.
Cipriani, Jason, "Download the Timehop iOS app to View, Share Past Events", Retrieved from https://www.cnet.com/how-to/download-the-timehop-ios-app-to-view-share-past-events/, Nov. 23, 2012, 7 Pages.
"Second Office Action Issued in Chinese Patent Application No. 201480034525.5", dated Nov. 1, 2018, 5 Pages.
"Office Action Issued in Korean Patent Application No. 10-2016-7001049", dated Sep. 26, 2020, 7 Pages.

* cited by examiner

April 2013        ⌐210

| Sunday | Monday | Tuesday | Wednesday | Thursday | Friday | Saturday |
|---|---|---|---|---|---|---|
| 31 | 1 | 2 | 3 | 4 | 5<br>5PM Swim | 6 |
| 7 | 8 | 9 | 10 | 11 | 12<br>5PM Swim | 13 |
| 14 | 15 | 16 | 17 | 18 | 19<br>5PM Swim | 20 |
| 21 | 22 | 23 | 24 | 25 | 26<br>5PM Swim | 27 |
| 28 | 29 | 30 | 1 | 2 | 3<br>5PM Swim | 4 |

April 2013        ⌐250

| Sunday | Monday | Tuesday | Wednesday | Thursday | Friday | Saturday |
|---|---|---|---|---|---|---|
| 31 | 1<br>Hiking Picture 2012 | 2 | 3 | 4 | 5<br>5PM Swim | 6 |
| 7 | 8 | 9<br>Hawaii Pictures<br>Hawaii 2007 | 10 | 11 | 12<br>5PM Swim | 13<br>Calendar-2011 |
| 14 | 15 | 16 | 17<br>Birthday Pictures 2008-2013 | 18 | 19<br>5PM Swim | 20 |
| 21<br>Current Date | 22 | 23<br>Link to Life Events | 24 | 25<br>Message 2011 | 26<br>5PM Swim | 27 |
| 28 | 29 | 30 | 1<br>SN Post - 2010 | 2 | 3<br>5PM Swim | 4 |

FIG.2

April 2013 310

| Sunday | Monday | Tuesday | Wednesday | Thursday | Friday | Saturday |
|---|---|---|---|---|---|---|
| 31 | 1 Hiking Picture 2012 | 2 | 3 | 4 | 5<br>5PM Swim | 6 |
| 7 | 8 | 9 Hawaii Pictures Hawaii 2007 | 10 | 11 | 12<br>5PM Swim | 13<br>Calendar-2011 |
| 14 | 15 | 16 | 17 Birthday Pictures 2008-2012 | 18 | 19<br>5PM Swim | 20<br>Current Date |
| 21 | 22 | 23 | 24 | 25 | 26<br>5PM Swim | 27 |
| 28 | 29 | 30 | 1 | 2 | 3<br>5PM Swim | 4 |

312

April 2013 350

| Sunday | Monday | Tuesday | Wednesday | Thursday | Friday | Saturday |
|---|---|---|---|---|---|---|
| 31 | 1 Hiking Picture 2012 | 2 | 3 | 4 | 5<br>5PM Swim | 6 |
| 7 | 8 | 9 Hawaii Pictures Hawaii 2007 | 10 | 11 | 12<br>5PM Swim | 13<br>Calendar-2011 |
| 14 | 15 | 16 | 17 Birthday Pictures 2008-2012 | 18 | 19<br>5PM Swim | 20<br>Current Date |
| 21 | 22 | 23 Link to Life Events | 24 | 25<br>Message 2011 | 26<br>5PM Swim | 27 |
| 28 | 29 | 30 | 1<br>SN Post - 2010 | 2 | 3<br>5PM Swim | 4 |

FIG.3

April 2013 ⟵ 410

| Sunday | Monday | Tuesday | Wednesday | Thursday | Friday | Saturday |
|---|---|---|---|---|---|---|
| 31 | 1 | 2 | 3 | 4 | 5<br>5PM Swim | 6 |
| 7 | 8 | 9 | 10 | 11 | 12<br>5PM Swim | 13 |
| 14 | 15 | 16 | 17 | 18 | 19<br>5PM Swim | 20<br>Current Date |
| 21 | 22 | 23 Link to Life Events | 24 | 25<br>Message 2011 | 26<br>5PM Swim | 27 |
| 28 | 29 | 30 | 1<br>SN Post - 2010 | 2 | 3<br>5PM Swim | 4 |

460

April 2013 ⟵ 450

| Monday | Tuesday | Wednesday |
|---|---|---|
| 22 | 23<br>Birthday Picture 1 2008  Birthday Picture 1 2010<br>Birthday Picture 2 2008  Birthday Picture 1 2011<br>Social Network Birthday Post(s)<br><br>Link to Life Events | 24 |

FIG.4

Mobile Computing Device

DISPLAYING LIFE EVENTS WHILE NAVIGATING A CALENDAR

BACKGROUND

Reminiscence is the act of remembering past life experiences. Many different applications capture life experiences. For example, social media and digital photography are widely used to capture life events as they occur. People may share these life events with other users. For example, a user may post a message or send a picture to other users. When a user wants to remember past experiences, they may browse through their photographs or posts.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Life events relating to a user are displayed on a calendar. A user may navigate to different time periods in the calendar and see past life events related to the user displayed on the calendar. While viewing a current time period in a calendar (e.g. a year, month, week, day), a user may see life events that have occurred in the displayed time period in previous years. The life events that are displayed in the calendar may include different types of content and be determined from different sources. For example, the life events for the time period may be: pictures, events, social media posts, messages, documents, and the like. Different content sources may be used to locate the life events relating to the user. For example, electronic picture storage locations, social media sites, calendars associated with the user, messaging applications associated with the user and the like may be searched to locate the life events. The life events that are selected for display on the calendar may be shown differently from other content that is included on the calendar. For example, the days may be shown using a different style indicating that the day includes one or more life events. The life events may also be labeled on the calendar. The life events that are located can be automatically selected by ranking the life events determined from the different content sources. The life events may be processed to adjust an appearance of the life event before it is displayed. For example, a title may be added to a picture, a collage may be created using pictures and messages, a slideshow may be created and the like. A user may also share a life experience with other users. The user may navigate forward or backward in time in the calendar to see life events.

BRIEF DESCRIPTION OF THE DRAWINGS

FIG. 2 shows exemplary displays of a calendar with and without life events displayed;

FIG. 3 shows a future view and a past view of a calendar for displaying life events;

FIG. 4 shows a future view and an expanded view of a calendar that is displaying life events;

DETAILED DESCRIPTION

Figure 1:
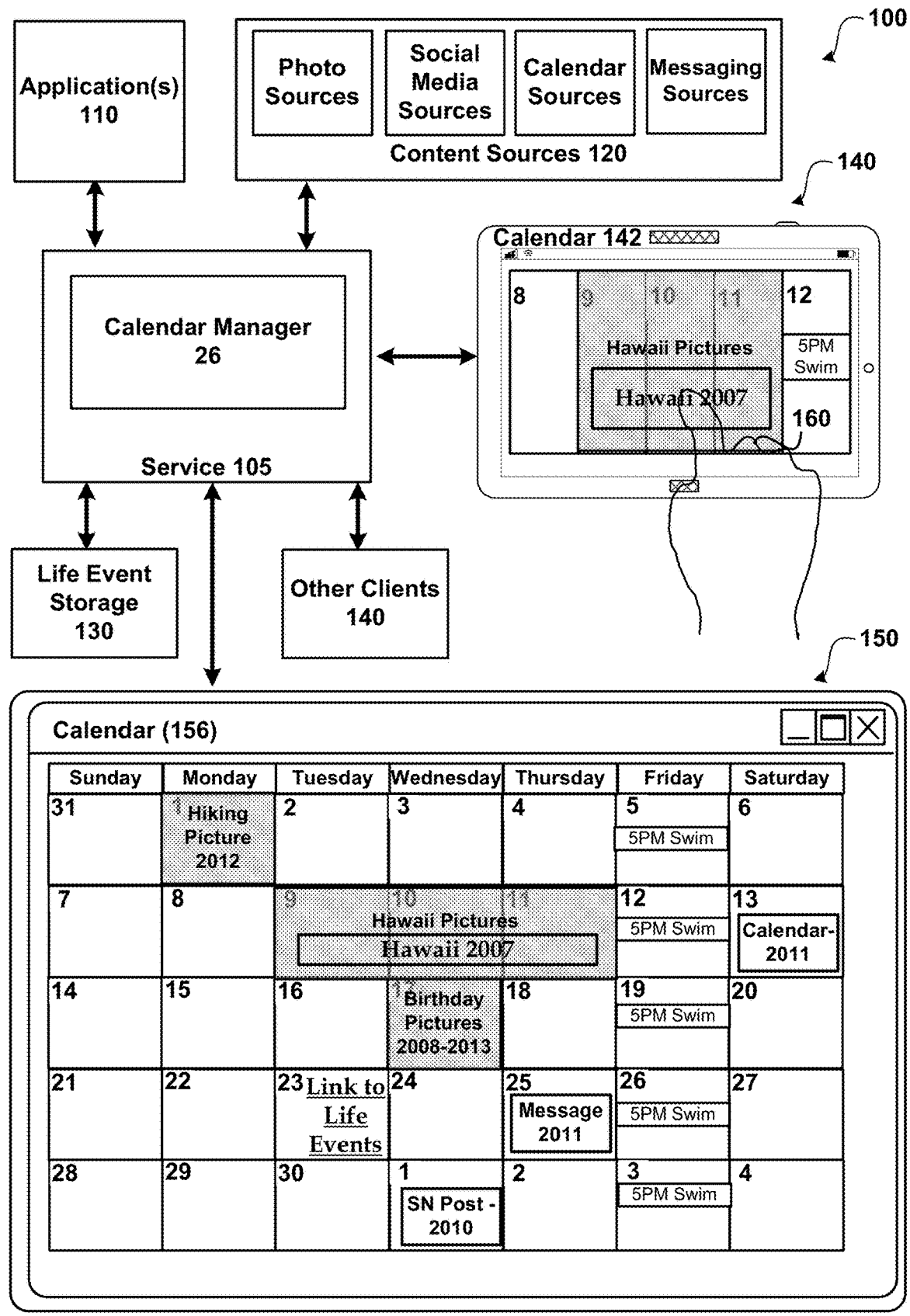
FIG. 1 shows a system that displays life events while navigating a calendar.

Referring now to the drawings, in which like numerals represent like elements, various embodiment will be described elements, various embodiment will be described.

FIG. 1 shows a system that displays life events while navigating a calendar.

As illustrated, system 100 includes application(s) 110, content sources 120, life event information 130, other clients 140, service 105, calendar manager 26, tablet computing device 140, and computing device 150.

Calendar manager 26 is configured to display life events that are related to a user on a calendar. A life event is a past life experience that is associated with a user. For example, the life event may be a picture, a video, a birthday, an anniversary, a party, a trip, a meeting, a calendar event, and the like. According to an embodiment, a user may configure the type of life events that they would like displayed as well as the content sources from which the life event content is to be obtained from. According to an embodiment, the life events that are related to a user may be life events that are associated with other users. For example, the life events may also include life events from the user's family (e.g., a spouse, a child, an aunt, an uncle, a brother-in-law, a grandparent . . . ) and/or one or more friends. According to an embodiment, when the calendar is a shared calendar, the life events relate to each of the users that are authorized to view the shared calendar. According to an embodiment, the other users authorize the use of their life events on other calendars.

Calendar manager 26 displays life events in a current view of a calendar, a future view of a calendar (e.g. next month, next year) as well as a past view of a calendar (e.g. last month, last year). As the user navigates to different time periods in the calendar, calendar manager 26 determines the life events related to the time period and displays life events that are determined to be related to the time period being viewed.

In the example shown on computing device 150, a user is viewing a month view (e.g. April 2013) that includes life events displayed on calendar 156. In the current example, calendar manager 26 displays the life events such that a user may readily distinguish life events from current events that are displayed on calendar 156. As illustrated, the life events are displayed differently (e.g. shaded, different border, highlighted, marked as life event, . . . ) compared to events scheduled on the calendar that are not life events. Calendar 156 shows different content displayed on calendar relating to a life event including pictures (April $1^{st}$ April $9^{th}$-April $11^{th}$, and April $17^{th}$), past calendar events (April $13^{th}$), a link to a life event (April $23^{rd}$) that when selected displays more content to the user, a past message (April $25^{th}$) and a past social network post (May $1^{st}$).

Tablet computing device 140 shows a display of calendar 142 that shows a user 160 selecting a past life event relating to a Hawaii trip from 2007. When a user selects a displayed life event, content that is associated with the life event may be displayed. For example, a picture may be displayed, a video may be played, social network posts may be displayed, and the like.

Calendar manager 26 may also process the life event content to automatically create a new view of the life event. The number of life events that are displayed may change based on the current date and the date of the life event. For example, more life events may be displayed when the life event is a date that has already passed on the calendar such that the calendar does not appear cluttered. A user may also configure how many life events to display as well as when the life events are to be displayed. According to an embodiment, the user may select from different views including: a past life event view that shows life events that have occurred in the past; a future life event view; and a complete life event view that shows life events in the past and in the future from the current date.

Calendar manager 26 accesses content from content sources 120 to determine life events that are associated with the user viewing the calendar. The user defines what content sources may be searched as well as what information may be stored (e.g. using life event storage 130) for use in the display of the life events for the user. Content sources 120 may include many different content sources. For example, the content sources may be photos sources (e.g. local storage and network storage of photos), social media sources (e.g. FACEBOOK, TWITTER, . . . ), calendar sources and messaging sources (e.g. MICROSOFT, GOOGLE, YAHOO, . . . ), and the like. The content sources may be associated with one or more users. For example, a family may have different content sources that they share. According to an embodiment, calendar manager 26 aggregates life event information for a user and stores the aggregated life event information in life event storage 130.

Calendar manager 26 processes the life event content to automatically determine what life event content to display on a calendar view. For example, calendar manager 26 extracts meta-data from the life event content to determine a date associated with the content (e.g. when a post was made, when a photo was taken) along with other information provided by the meta-data.

After determining life events for a time period (e.g. a day, a week, a month, a year), calendar manager 26 ranks the life events and selects the life events to include on the calendar. Different ranking schemes may be used. For example, a number of replies to a social network post, a quality of an image, a number of images from a certain date, and the like may be used to rank the life events.

Calendar manager 26 may also process the selected life event content to create a different view of the content. For example, photo processing may be performed, a title may be added to a picture, a collage may be created using pictures and messages, a slideshow may be created and the like. A user may also share a life experience with other users. The user may navigate forward or backward in time in the calendar to see life events.

In order to facilitate communication with calendar manager 26, one or more callback routines, may be implemented. Application (s) 110 may be a variety of applications, such as calendar applications, business productivity applications, entertainment applications, music applications, travel applications, video applications, social network applications, and the like. Generally, application(s) 110 may be any application that displays a calendar to include life events. The application(s) 110 may be configured to receive different types of input (e.g. speech input, touch input, keyboard input (e.g. a physical keyboard and/or Software Input Panel (SIP)) and/or other types of input. Service 105 may be any service that provides calendar services including life events.

System 100 as illustrated comprises one or more touch screen input devices, such as tablet computing device 140, that detects when a touch input has been received (e.g. a finger touching or nearly touching the touch screen). Any type of touch screen may be utilized that detects a user's touch input. More details are provided below.

FIG. 2 shows exemplary displays of a calendar with and without life events displayed.

Display 210 shows a calendar view for the month of April 2013 that does not include a display of life events. According to an embodiment, a user may select from different calendar views that change how life events that are associated with the user are displayed on the calendar. For example, a no life event view may be selected, a past life event view may be selected, a future life vent view may be selected or a combined life event view may be selected.

Display 250 shows a calendar view for the month of April 2013 that includes life events displayed both in the past and in the future. For purposes of explanation, the current date is Apr. 21, 2013. As illustrated, the life events are displayed differently (e.g. shaded, different border, highlighted, marked as life event, . . . ) compared to events scheduled on the calendar. Display 250 shows different content displayed on calendar relating to a life event including a hiking picture from 2012 on April $1^{st}$, pictures from a Hawaii trip between April $9^{th}$-April $11^{th}$ in 2007, a past calendar event from 2011 on April $13^{th}$, birthday pictures on April $17^{th}$, a link to a life event on April $23^{rd}$, a message from 2011 on April $25^{th}$, and a past social network post on May $1^{st}$. A user may select a life event that is displayed on the calendar to see a larger view of a life event item or access more life event information. A user may also select one or more of the life events to share with other users. For example, a user may post the selected life event information to a social network or send a message with the content or a link to the content.

FIG. 3 shows a future view and a past view of a calendar for displaying life events.

Display 310 shows a calendar view for the month of April 2013 that includes a display of life events when a past life event view is selected for the display of the calendar. In the example shown in FIG. 3, April $20^{th}$ is the current date. As can be seen by referring to display 310, there are not any life events displayed past the current date (April $20^{th}$ in this example).

Display 350 shows a calendar view for the month of April 2013 that includes a display of life events when a complete life event view is selected. As can be seen by referring to display 350, life events are displayed in the future as well as in the past from the current date. Display 350 shows the life events in the future displayed differently from the life events in the past.

FIG. 4 shows a future view and an expanded view of a calendar that is displaying life events.

Display 410 shows a calendar view for the month of April 2013 that includes a display of life events when a future life event view is selected. In the example shown in FIG. 4, April $20^{th}$ is the current date. As can be seen by referring to display 410, there are not any life events displayed in the past.

Display 450 shows a multi-day view of a week that includes a display of life events. In the current example, user 460 has selected to change the calendar view from a month view to a multi-day view. As can be seen by referring to display 450, more life events are exposed when a view of the time period increases in size. In the current example, the month view for April 23$^{rd}$ shows the "Link to Life Events" without other life events. The expanded view of April 23$^{r1}$, however, shows birthday pictures from previous years along with past social network birthday posts and the "Link to Life Events".

Figure 5:
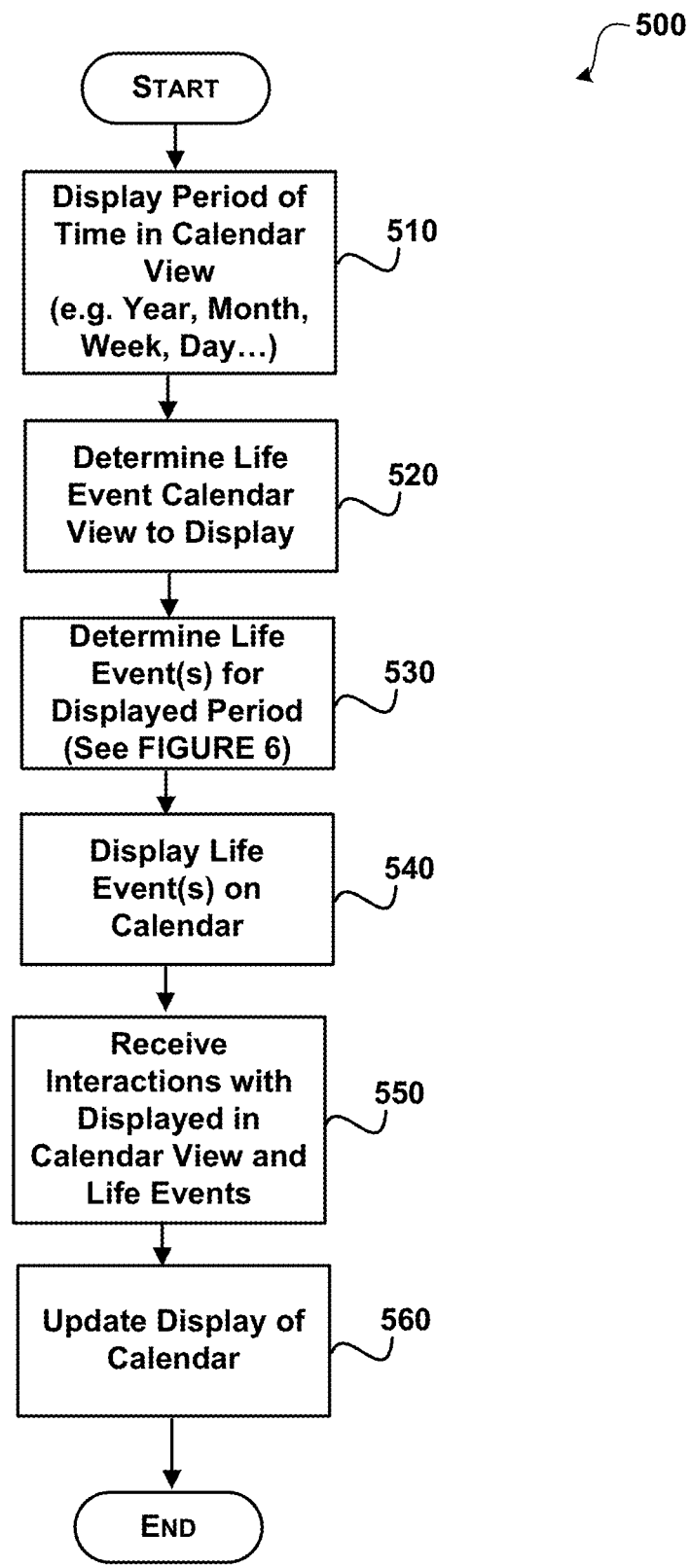
FIG. 5 illustrates a process for displaying life events in a calendar view and interacting with the life events.
Figure 6:
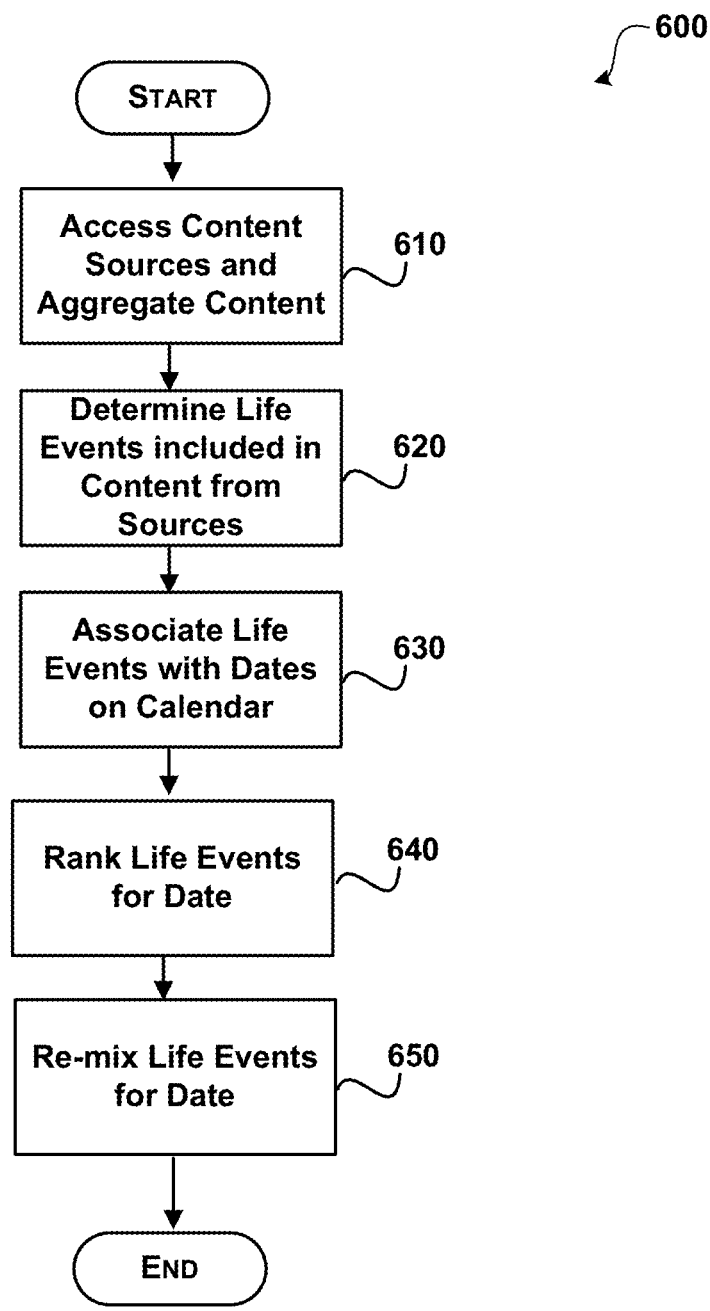
FIG. 6 illustrates a process for determining and selecting life events for display in a calendar view.

FIGS. 5 and 6 illustrate navigating a calendar including life events that are associated with a user. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof. While the operations are shown in a particular order, the order of the operations may change, be performed in parallel, depending on the implementation.

FIG. 5 illustrates a process for displaying life events in a calendar view and interacting with the life events.

After a start operation, the process moves to operation 510, where a period of time for a calendar view is displayed. For example, the time period may be a day, multiple days, a week, a month, a year, and the like.

Transitioning to operation 520, a determination is made as to what life event calendar view to display. According to an embodiment, a user may select a no life event view of a calendar, a past life event view of a calendar, a future life event view of a calendar, or a combined life event view of a calendar. The no life event view does not show life events on the display of the calendar. The past life event view of the calendar shows life events on days of the calendar that are older than the current date. The future life event view shows life events on days of the calendar that are in the future. The combined life event view shows life events on any day that is displayed on the calendar.

Flowing to operation 530, the life events for a displayed period of time that are associated with a user are determined. According to an embodiment, the life events that are associated with a user may be life events that are associated with other users (e.g., family, friends . . . ). One or more different content sources are accessed to determine the life events that relate to the user. For example, different content sources are accessed to obtain and determine life events that are associated with the user viewing the calendar. As discussed, the user defines what content sources may be searched as well as what information may be stored for use in the display of the life events for the user. Content sources may include many different content sources, such as, but not limited to: photos sources (e.g. local storage and network storage of photos), social media sources (e.g. FACEBOOK, TWITTER, . . . ), calendar sources and messaging sources (e.g. MICROSOFT, GOOGLE, YAHOO, . . . ), and the like. According to an embodiment, the life event information is aggregated stored for later processing. The aggregated life event information is processed to automatically determine what life event content to display on a calendar view. For example, meta-data may be extracted from the life event content to determine a date associated with the content (e.g. when a post was made, when a photo was taken) along with other information provided by the meta-data.

Transitioning to operation 540, the determined life events are displayed on the calendar according to the selected life event view for the calendar. According to an embodiment, the life events are displayed differently (e.g. shaded, different border, highlighted, marked as life event, . . . ) as compared to other events that are displayed on the calendar.

Flowing to operation 550, interactions with the displayed life events are received. A user may select a life event to see more information or select an event for sharing. For example, a user may select the life event to see a larger display of the life event (e.g. a larger picture) or access more life events related to the date.

When the interaction is for sharing a life event, the user determines the method of sharing. For example, a user may post the selected life event information to a social network or send a message with the content or a link to the content. A user may also change the life event view mode.

Transitioning to operation 560, the display of the calendar is updated in response to the received interaction.

The process flows to an end operation and returns to processing other actions.

FIG. 6 illustrates a process for determining and selecting life events for display in a calendar view.

After a start operation, the process moves to operation 610, where content sources are accessed. One or more different content sources are accessed to determine the life events that relate to the user. For example, different content sources are accessed to obtain and determine life events that are associated with the user viewing the calendar. As discussed, the user defines what content sources may be searched as well as what information may be stored for use in the display of the life events for the user. Content sources may include many different content sources, such as, but not limited to: photos sources (e.g. local storage and network storage of photos), social media sources (e.g. FACEBOOK, TWITTER, . . . ), calendar sources and messaging sources (e.g. MICROSOFT, GOOGLE, YAHOO, . . . ), and the like. According to an embodiment, the life event information is aggregated stored for later processing.

Transitioning to operation 620, the life events that are included in the accessed content sources are determined. The aggregated life event information is processed to automatically determine what life event content to display on a calendar view. For example, meta-data may be extracted from the life event content to determine a date associated with the content (e.g. when a post was made, when a photo was taken) along with other information provided by the meta-data.

Transitioning to operation 630, the determined life events are associated with dates on the calendar. For example, the meta-data may be used to identify a date or dates for which the determined life event is associated.

Flowing to operation 640, the determined life events for the time period of the calendar view are ranked. Different ranking schemes may be used. For example, a number of replies to a social network post, a quality of an image, a number of images from a certain date, and the like may be used to rank the life events. A user may also configure settings that adjust the ranking of life events. For example, a user may set different criteria that affect a ranking of life events (e.g. family events are ranked higher than work events, pictures are ranked higher than messages, and the like).

Transitioning to operation 650, zero or more of the life events may be processed. For example, photo processing may be performed, a title may be added to a picture, a collage may be created using pictures and messages, a slideshow may be created and the like.

The process flows to an end operation and returns to processing other actions.

Figure 7:
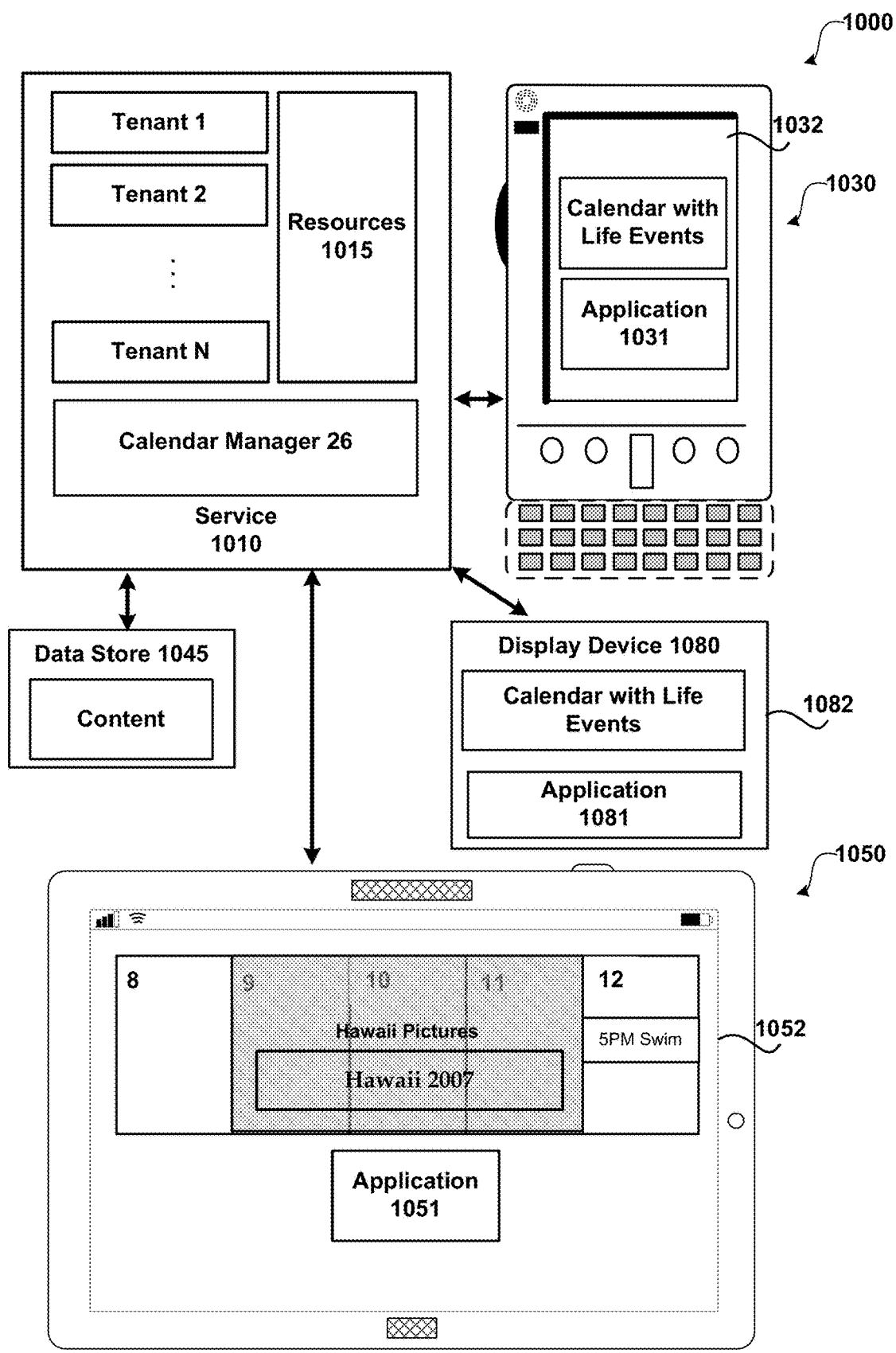
FIG. 7 illustrates an exemplary online system for displaying life events while navigating a calendar.

FIG. 7 illustrates an exemplary online system for displaying life events while navigating a calendar. As illustrated, system 1000 includes service 1010, data store 1045, touch screen input device 1050 (e.g. a tablet/slate), smart phone 1030 and display device 1080.

As illustrated, service 1010 is a cloud based and/or enterprise based service that may be configured to provide services, such as services related to various applications that display calendars such as productivity services (e.g. personal information management, spreadsheets, documents, presentations, charts, messages, and the like)). The service may be interacted with using different types of input/output. For example, a user may use speech input, touch input, hardware based input, and the like. The service may provide speech output that combines pre-recorded speech and synthesized speech. Functionality of one or more of the services/applications provided by service 1010 may also be configured as a client/server based application.

As illustrated, service 1010 is a multi-tenant service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

According to an embodiment, smart phone 1030, touch screen input device 1050, and device 1080 include an application (1031, 1051, 1081) that displays a calendar with life events.

As illustrated, touch screen input device 1050, smart phone 1030, and display device 1080 shows exemplary displays 1052/1032/1082 showing the use of an application that displays a calendar with life events. Data may be stored on a device (e.g. smart phone 1030, slate 1050 and/or at some other location (e.g. network data store 1045). Data store 1045, or some other store, may be used to store life event information as well as other data. The applications used by the devices may be client based applications, server based applications, cloud based applications and/or some combination. According to an embodiment, display device 1080 is a device such as a MICROSOFT XBOX coupled to a display.

Calendar manager 26 is configured to perform operations relating to displaying life events in a calendar as described herein. While manager 26 is shown within service 1010, the functionality of the manager may be included in other locations (e.g. on smart phone 1030 and/or slate device 1050 and/or device 1080).

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 8:
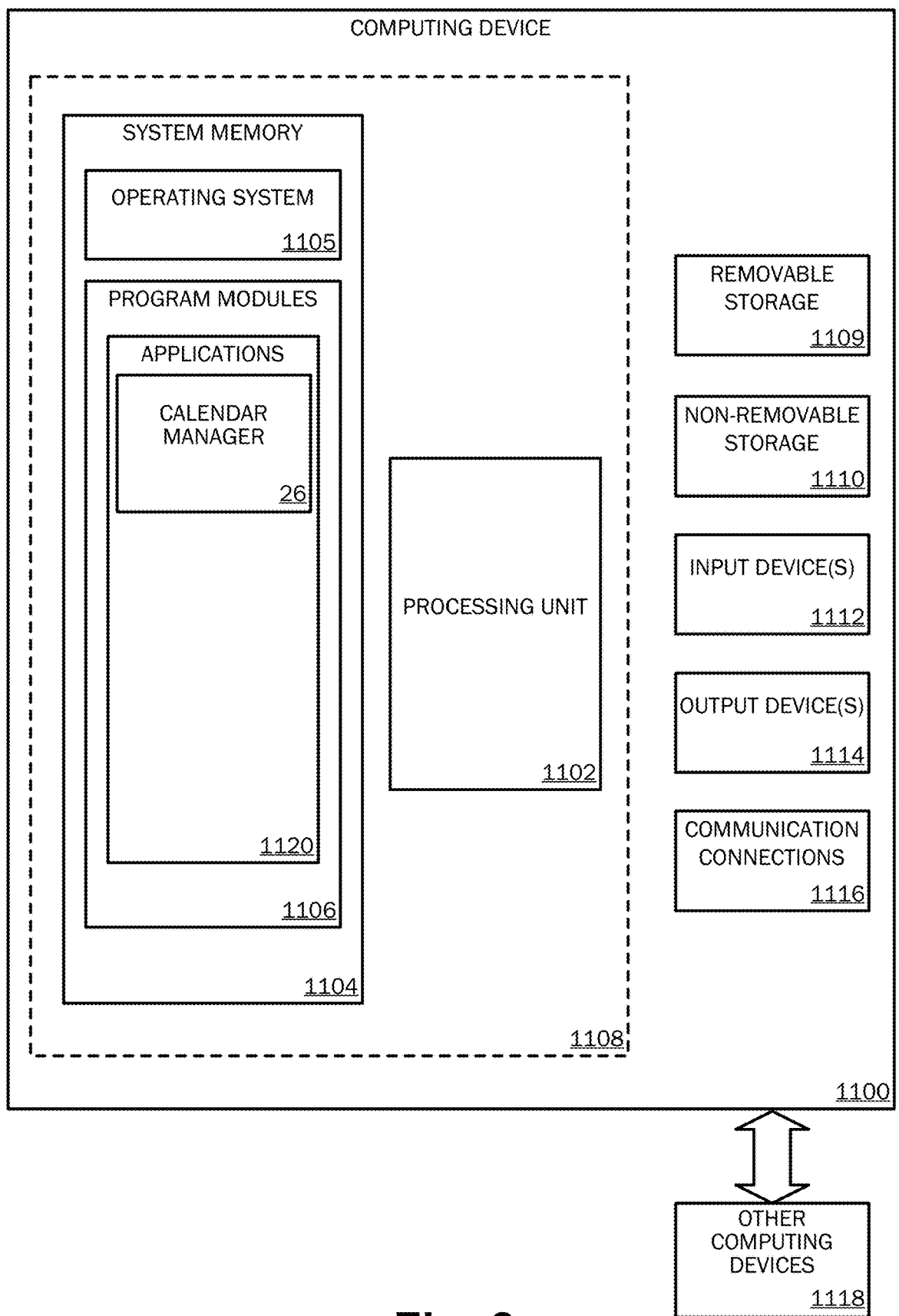
FIG. 8 is a block diagram illustrating physical components of a computing device.
Figure 9A:
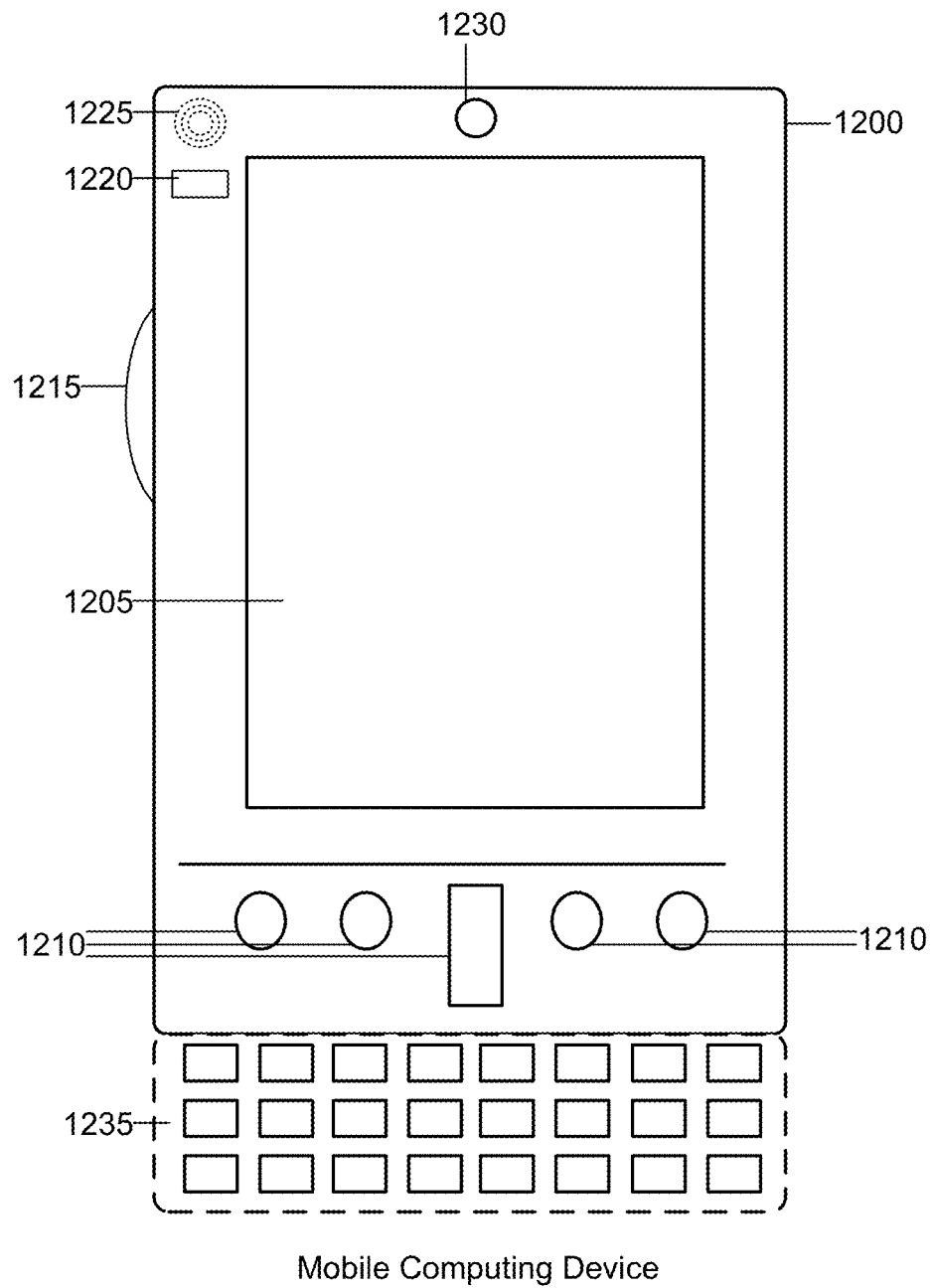
FIG. 9A illustrate a mobile computing device.
Figure 9B:
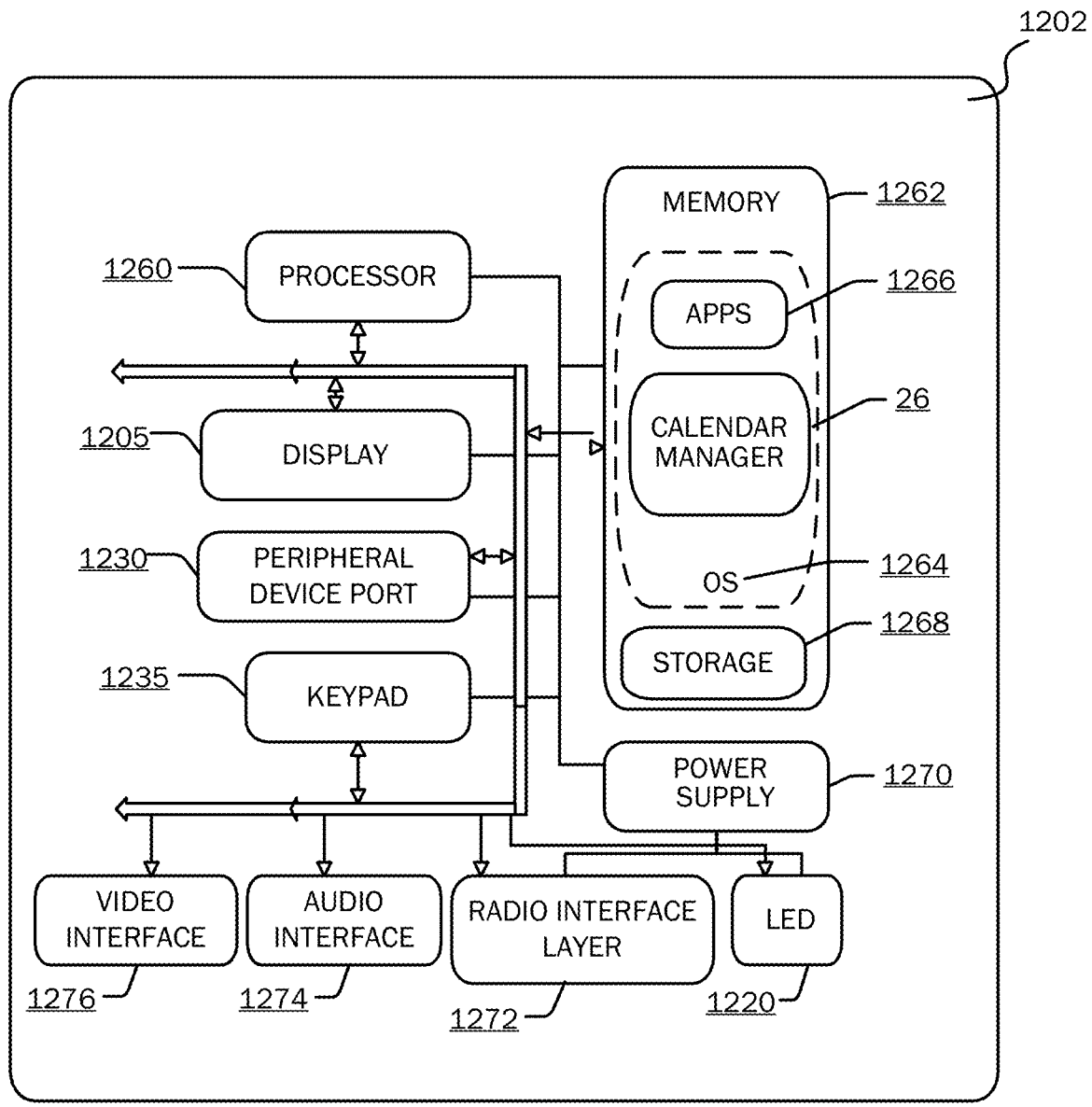
FIG. 9B is a block diagram illustrating the architecture of one embodiment of a mobile computing device.
Figure 10:
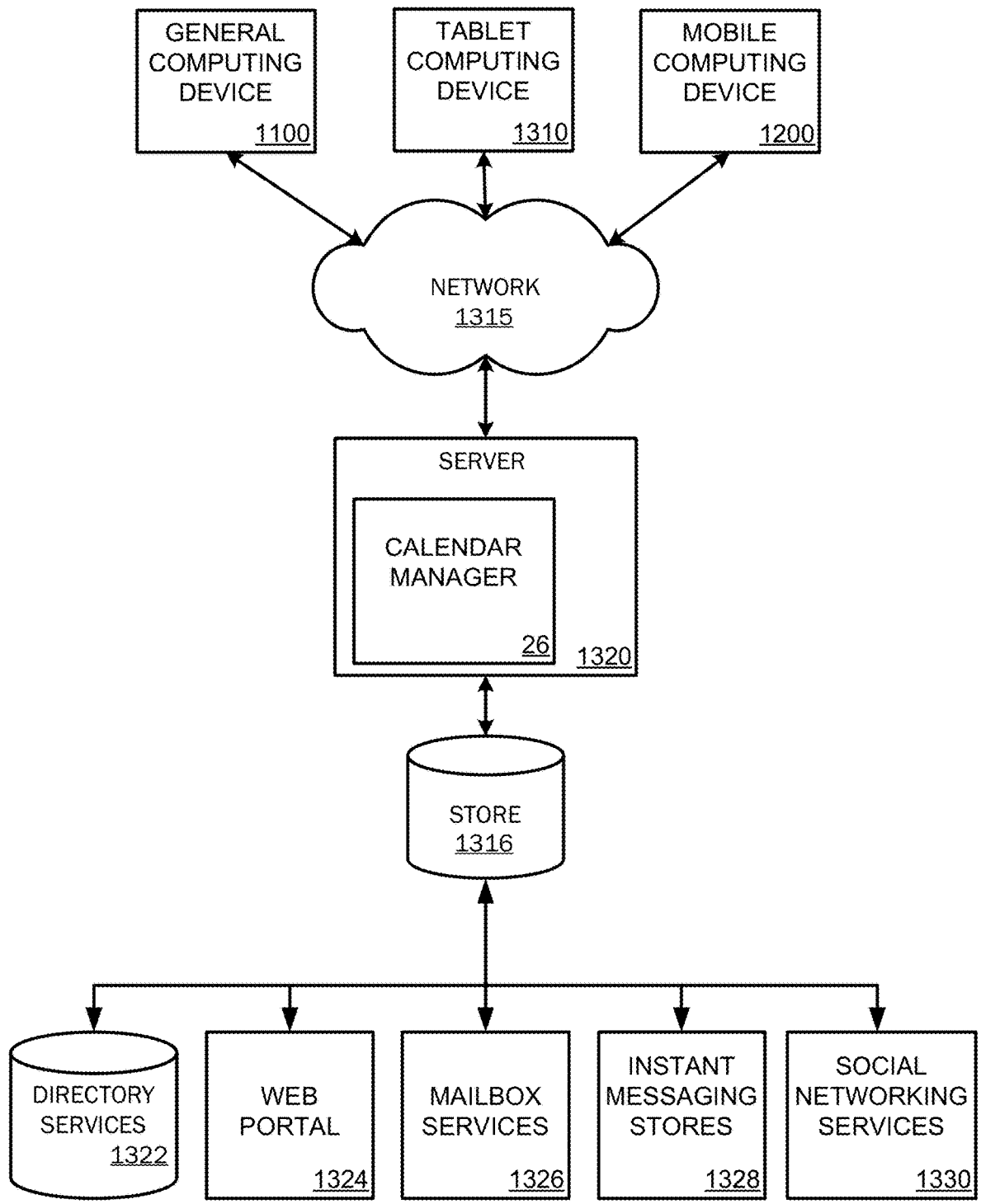
FIG. 10 illustrates an embodiment of an architecture of a system for displaying life events.

FIGS. 8-10 and the associated descriptions provide a discussion of a variety of operating environments in which embodiments of the invention may be practiced. However, the devices and systems illustrated and discussed with respect to FIGS. 8-10 are for purposes of example and illustration and are not limiting of a vast number of computing device configurations that may be utilized for practicing embodiments of the invention, described herein.

FIG. 8 is a block diagram illustrating physical components (i.e., hardware) of a computing device 1100 with which embodiments of the invention may be practiced. The computing device components described below may be suitable for the computing devices described above. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running software applications 1120 such as the calendar manager 26. The operating system 1105, for example, may be suitable for controlling the operation of the computing device 1100. Furthermore, embodiments of the invention may be practiced in conjunction with a graphics library, other operating systems, or any other application program and is not limited to any particular application or system. This basic configuration is illustrated in FIG. 8 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 8 by a removable storage device 1109 and a non-removable storage device 1110.

As stated above, a number of program modules and data files may be stored in the system memory 1104. While executing on the processing unit 1102, the program modules 1106 (e.g., the calendar manager 26) may perform processes including, but not limited to, one or more of the stages of the methods and processes illustrated in the figures. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the calendar manager 26 may be operated via application-specific logic integrated with other components of the computing device 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1100 may also have one or more input device(s) 1112 such as a keyboard, a mouse, a pen, a sound input device, a touch input device, etc. The output device(s) 1114 such as a display, speakers, a printer, etc. may also be included. The aforementioned devices are examples and others may be used. The computing device 1100 may include one or more communication connections 1116 allowing communications with other computing devices 1118. Examples of suitable communication connections 1116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 9A and 9B illustrate a mobile computing device 1200, for example, a mobile telephone, a smart phone, a tablet personal computer, a laptop computer, and the like, with which embodiments of the invention may be practiced. With reference to FIG. 9A, one embodiment of a mobile computing device 1200 for implementing the embodiments is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative embodiments, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some embodiments, the mobile computing device 1200 incorporates a vibration transducer for providing the user with tactile feedback. In yet another embodiment, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one embodiment of a mobile computing device. That is, the mobile computing device 1200 can incorporate a system 1202 (i.e., an architecture) to implement some embodiments. In one embodiment, the system 1202 is implemented as a "smart phone" capable of running one or more applications (e.g., browser, e-mail, calendaring, contact managers, messaging clients, games, and media clients/players). In some embodiments, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including the calendar manager 26 as described herein.

The system 1202 has a power supply 1270, which may be implemented as one or more batteries. The power supply 1270 might further include an external power source, such as an AC adapter or a powered docking cradle that supplements or recharges the batteries.

The system 1202 may also include a radio 1272 that performs the function of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs 1266 via the operating system 1264, and vice versa.

The visual indicator 1220 may be used to provide visual notifications, and/or an audio interface 1274 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present invention, the microphone may also serve as an audio sensor to facilitate control of notifications, as will be described below. The system 1202 may further include a video interface 1276 that enables an operation of an on-board camera to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 9B by the non-volatile storage area 1268. Mobile computing device 1200 may also include peripheral device port 1230.

Data/information generated or captured by the mobile computing device 1200 and stored via the system 1202 may be stored locally on the mobile computing device 1200, as described above, or the data may be stored on any number of storage media that may be accessed by the device via the radio 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 10 illustrates an embodiment of an architecture of an exemplary system, as described above. Content developed, interacted with, or edited in association with the calendar manager 26 may be stored in different communication channels or other storage types. For example, various documents may be stored using a directory service 1322, a web portal 1324, a mailbox service 1326, an instant messaging store 1328, or a social networking site 1330. The calendar manager 26 may use any of these types of systems or the like for enabling data utilization, as described herein. A server 1320 may provide the calendar manager 26 to clients. As one example, the server 1320 may be a web server providing the calendar manager 26 over the web. The server 1320 may provide the calendar manager 26 over the web to clients through a network 1315. By way of example, the client computing device may be implemented as the computing device 1100 and embodied in a personal computer, a tablet computing device 1310 and/or a mobile computing device 1200 (e.g., a smart phone). Any of these embodiments of the client computing device 1100, 1310, and 1200 may obtain content from the store 1316.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method for displaying two or more life events associated with a date, comprising:
   determining a date of a first year to display to a first user;
   enabling the display of a user interface of life events, wherein each of the life events occurred on the date and is chronologically ordered by year, wherein a user navigates the user interface forward or backward in time by year to view the life events;
   accessing a social media source;
   determining a first life event of the life events, associated with the first user, from a social media post shared by a second user on the social media source;
   retrieving the first life event from the social media post, wherein the first life event is associated with the first user, the second user, and an occurrence in the first user's life, and wherein the first life event from the social media post includes a media element;
   determining, by identifying metadata associated with the first life event shared by and associated with the second user, that the first life event is associated with the date in a second year different than the first year;
   automatically determining if the first life event should be displayed to the first user by evaluating the metadata to identify a relationship between the first life event and the date;
   determining a second life event of the life events, the second life event occurred on the date in a third year different than the first year and the second year;
   automatically determining the second life event should be displayed to the first user by identifying a relationship between the second life event and the date;
   enabling a display of life events that occurred on the date, and
   upon determining that the first life event shared by and associated with the second user should be displayed to the first user and that the second life event should displayed, enabling the display of the first life event with the media element and the second life event in the user interface for the first user.

2. The method of claim 1, wherein determining the metadata is associated with at least one of:
   a photo that includes the second user that is associated with the date in the second year;
   a social media post made by the second user that is associated with the date in the second year; or
   a social media post made about the second user that is associated with the date in the second year; and
   further comprising: displaying at least one of the photo or the social media post in the user interface.

3. The method of claim 1, further comprising:
   determining life events that have already occurred for the first user by accessing content sources comprising digital photo content sources, social media sources, and calendar event sources; and
   identifying life events by a date of occurrence.

4. The method of claim 1, wherein the user interface is a calendar, wherein enabling the display of the calendar with the first life event comprises enabling the display of a remixed picture within the calendar that includes a picture and other life event content.

5. The method of claim 1, wherein the user interface is a calendar, wherein enabling the display of the calendar with the first life event comprises enabling the display of different life events for the first user on a same day for the date on the calendar.

6. The method of claim 1, further comprising sharing a displayed item in the user interface in response to receiving a selection to share the displayed item.

7. The method of claim 1, further comprising determining personal event dates that related to the first user and displaying life events related to the personal event dates.

8. The method of claim 1, wherein evaluating the metadata of the first life event comprises analyzing at least one of: a number of replies to a social network post, a quality of an image, a number of images from a certain date, and an identity of at least one user associated with the first life event.

9. A computer-readable storage media storing computer-executable instructions for displaying life events, comprising:
   determining a date of a first year to display to a first user;
   determining a first life event that occurred on the date in a second year, the first life event retrieved from a social media post shared with the first user by a second user on a social media source, wherein the first life event is associated with the first user, the second user, and is an occurrence in the first user's life, wherein the second year is earlier than the first year, and wherein the first life event retrieved from the social media post includes a media element;
   determining a second life event occurred on the date in a third year, wherein the second life event is associated with a third user, and wherein the third year is earlier than the first year and the second year;
   automatically determining the first life event should be displayed to the first user by identifying a relationship between the first life event and the date;
   automatically determining the second life event should be displayed to the first user by identifying a relationship between the second life event and the date; and
   enabling the display of life events, wherein each life event occurred on the date, the display comprising the first life event with the media element and the second life event ordered chronologically according to the first year, the second year, and the third year, and wherein the first user navigates the user interface forward or backward in time to view the first life event and the second life event.

10. The computer-readable storage media of claim 9, wherein the media element is at least one of:
    a photo that includes the second user that is associated with the date of the second year;
    a social media post made by the second user that is associated with the date of the second year; or
    a social media post made about the second user that is associated with the date of the second year; and
    further comprising: enabling the display of at least one of the photo or the social media post in the user interface.

11. The computer-readable storage media of claim 9, further comprising:
    accessing different content sources for the the second life event, the different content sources selected from a group consisting of: digital photo content sources, social media sources, and calendar event sources; and aggregating content obtained from the different content sources.

12. The computer-readable storage media of claim 9, wherein the user interface is a calendar, wherein enabling the display of the calendar with the first life event displayed comprises enabling the display of a picture within the calendar that includes a picture that is modified with other life event content.

13. The computer-readable storage media of claim 9, wherein the user interface is a calendar, wherein enabling the display of the calendar with the first life event displayed comprises displaying two or more different life events for the first user on a same day for the date on the calendar.

14. The computer-readable storage media of claim 9, further comprising sharing a displayed life item in the user interface with a third user.

15. The computer-readable storage media of claim 9, wherein determining the first life event comprises analyzing at least one of: a number of replies to a social network post, a quality of an image, a number of images from a certain date, and an identity of at least one user associated with the first life event.

16. A system, comprising:
a processor and memory;
an operating environment executing using the processor; and
a life event manager executing using the processor that performs actions comprising:
 determining a date of a first year to display to a first user;
 determining a first life event occurred on the date in a second year, the first life event from a social media post shared with the first user by a second user on a social media source, wherein the first life event is associated with the first user, the second user, and an occurrence in the first user's life, wherein the second year is different than the first year;
 retrieving the first life event from the social media post, and wherein the first life event from the social media post includes a media element;
 determining a second life event occurred on the date in a third year different than the first year and obtained from a content source different than that of the first life event;
 automatically determining the first life event should be displayed to the first user by identifying a relationship between the first life event and the date;
 automatically determining the second life event should be displayed to the first user by identifying a relationship between the second life event and the date; and
 generating a display of only life events that occurred on the date, the display comprising the media element for the first life event and the second life event, ordered chronologically according to the second year and the third year, wherein the first user navigates the user interface forward or backward in time, by year, to view the first life event and the second life event.

17. The system of claim 16, wherein the media element is at least one of:
a photo that includes the second user that is associated with the date of the second year;
a social media post made by the second user that is associated with the date of the second year; or
a social media post made about the second user that is associated with the date of the second year;
and
further comprising: displaying at least one of the photo or the social media post in the user interface.

18. The system of claim 16, further comprising accessing different content sources for the first life event and the second life event, the different content sources selected from a group consisting of: digital photo content sources, social media sources, and calendar event sources and aggregating content obtained from the different content sources.

19. The system of claim 16, further comprising receiving a selection of one of the displayed life events and displaying more content in response to the selection.

20. The system of claim 16, wherein determining the first life event comprises analyzing at least one of: a number of replies to a social network post, a quality of an image, a number of images from a certain date, and an identity of at least one user associated with the first life event.

* * * * *